US009677520B2

(12) United States Patent
Buehner et al.

(10) Patent No.: US 9,677,520 B2
(45) Date of Patent: Jun. 13, 2017

(54) VALVE FOR METERING FLUID

(71) Applicant: Robert Bosch GmbH, Stuttgart (DE)

(72) Inventors: Martin Buehner, Backnang (DE);
Michael Mayer, Wannweil (DE);
Michael Knorpp, Weissach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/398,200

(22) PCT Filed: Mar. 22, 2013

(86) PCT No.: PCT/EP2013/056118
§ 371 (c)(1),
(2) Date: Oct. 31, 2014

(87) PCT Pub. No.: WO2013/164131
PCT Pub. Date: Nov. 7, 2013

(65) Prior Publication Data
US 2015/0090913 A1    Apr. 2, 2015

(30) Foreign Application Priority Data

May 4, 2012  (DE) .................. 10 2012 207 406

(51) Int. Cl.
*F02M 51/00*    (2006.01)
*F02M 51/06*    (2006.01)
(Continued)

(52) U.S. Cl.
CPC ...... *F02M 51/061* (2013.01); *F02M 51/0685* (2013.01); *F16F 1/324* (2013.01);
(Continued)

(58) Field of Classification Search
CPC ........... F02M 51/0685; F02M 2200/50; F02M 51/061; F02M 2200/26; F16F 1/324; F16K 27/029; F16K 31/0665
(Continued)

(56) References Cited

U.S. PATENT DOCUMENTS 5,609,304 A * 3/1997 Sasao .................... 239/585.4
6,089,467 A * 7/2000 Fochtman et al. ............ 239/5
(Continued)

FOREIGN PATENT DOCUMENTS

DE    198 49 210    4/2000
DE    199 32 763    1/2001
(Continued)

*Primary Examiner* — Craig J Price
(74) *Attorney, Agent, or Firm* — Norton Rose Fulbright US LLP; Gerard Messina

(57) ABSTRACT

A valve for metering fluid is reported which has a valve housing having a valve opening and a valve seat, a valve needle, which is provided for the alternating closing and opening of the valve using a closing member cooperating with the valve seat, a resetting element that acts on the valve needle for closing the valve and an electromagnet that is able to have current applied to it, having a magnet armature that is drivable to a lift motion, which sits axially displaceably on the valve needle and carries along the valve needle in the lift direction for opening the valve via a driving flange situated on it. To simplify production and the assembly of the valve while achieving the advantages characteristic in valves having a prestroke spring and an armature free path, the magnet armature is supported on the valve housing using a diaphragm spring.

6 Claims, 2 Drawing Sheets

(51) Int. Cl.
*F16F 1/32* (2006.01)
*F16K 27/02* (2006.01)
*F16K 31/06* (2006.01)

(52) U.S. Cl.
CPC ........ *F16K 27/029* (2013.01); *F16K 31/0665* (2013.01); *F02M 2200/26* (2013.01); *F02M 2200/50* (2013.01)

(58) Field of Classification Search
USPC ..... 251/129.21, 77; 239/585.1, 585.4, 585.5, 239/900
See application file for complete search history.

(56) References Cited

U.S. PATENT DOCUMENTS

| | | | |
|---|---|---|---|
| 6,494,388 B1* | 12/2002 | Mueller et al. | 239/533.12 |
| 6,764,031 B2* | 7/2004 | Sebastian et al. | 239/584 |
| 6,994,110 B2* | 2/2006 | Barillot | F16K 31/004 |
| | | | 137/554 |
| 7,506,827 B2* | 3/2009 | Petrone et al. | 239/585.1 |
| 7,770,823 B2* | 8/2010 | Kubota et al. | 239/533.14 |
| 7,774,126 B2* | 8/2010 | Abe et al. | 239/585.5 |
| 8,087,400 B2* | 1/2012 | Achleitner et al. | 123/490 |
| 8,505,835 B2* | 8/2013 | Scheffel | 239/585.5 |
| 8,556,194 B2* | 10/2013 | Mieney et al. | 239/585.1 |
| 8,960,157 B2* | 2/2015 | Kusakabe et al. | 239/585.1 |
| 2007/0194152 A1* | 8/2007 | Abe et al. | 239/585.2 |
| 2007/0235669 A1* | 10/2007 | Suzuki et al. | 239/585.5 |

FOREIGN PATENT DOCUMENTS

| | | |
|---|---|---|
| DE | 199 46 602 | 4/2001 |
| DE | 101 08 945 | 9/2002 |
| FR | 1 375 648 | 10/1964 |
| JP | H-04080977 A | 7/1992 |
| JP | 2004518858 A | 6/2004 |

* cited by examiner

VALVE FOR METERING FLUID

FIELD OF THE INVENTION

The present invention relates to a valve for metering fluid, the generic term fluid standing for a streaming or flowing medium being used in agreement with the fluid dynamics for gases and liquids.

BACKGROUND INFORMATION

In the case of one fuel injector (German document DE 101 08 945 A1), the valve needle is connected with force locking to a magnet armature of an electromagnet and carries a closing member which, together with the valve seat, forms a sealing seat on the valve opening, which is produced for closing the valve and canceled out for opening the valve. To produce the sealing seat, a return spring, which is supported on the end of the valve needle facing away from the closing member and on an adjusting sleeve, presses the closing member onto the valve seat. The valve needle has a collar-shaped armature stop and a driving flange which make possible a so-called prestroke of the magnet armature, by which the magnet armature is able to be displaced axially on the valve needle. A prestroke spring configured as a helical compression spring, in this case, presses the magnet armature against the armature stop with force locking. When a current is applied to the electromagnet, the armature is moved, against the spring force of the prestroke spring and the return spring, in the lift of stroke direction. In this context, the overall lift of stroke is subdivided into the prestroke and the actual opening lift of stroke having the lifting off of the closing member from the valve seat. During the prestroke, the closing member still remains on the valve seat. The opening lift of stroke sets in as soon as the armature strikes the driving flange after the end of the prestroke, and via the latter, drives the valve needle in the lift of stroke direction.

Such a valve has the advantage over a valve, having a rigid connection of armature and valve needle, that the inert mass moved in response to the valve closing is divided up into two partial masses, namely into the magnet armature and the valve needle having the closing member, which leads to a reduction in noise during the closing of the valve. The prestroke spring and the armature free play, on the one hand, improve the opening dynamics of the valve and, on the other hand, damp so-called bounce pulses, which lead to a metering quantity of fluid that is not reproducible. The opening dynamics are achieved by the so-called mechanical boostering, in that the prestroke spring that is prestressed in the closed state of the valve accelerates the magnet armature in addition to the magnetic force of the electromagnet, so that the valve may be opened using a lesser force expenditure. The bounce pulses are avoided by the damping effect of the prestroke spring, since the prestroke spring, during the closing of the valve after the first hitting of the closing member on the valve seat, damps a motion of the magnet armature in the lift stroke direction created by the rebounding of the magnet armature, and thus prevents a renewed, brief lifting off of the closing member from the valve seat made possible by the magnet armature striking the armature stop.

Additional valves having a prestroke spring and an armature free play are discussed in DE 198 49 210 A1, DE 199 32 763 (FIG. 2) and DE 199 46 602 A1.

SUMMARY OF THE INVENTION

The metering valve, according to the present invention, having the features described herein has the advantage over valves having a rigid connection of magnet armature and valve needle, that, during the closing process of the valve, the inert mass moved is divided up into two partial masses, so that, because of the mass of the valve needle hitting the valve seat during the closing of the valve, that is clearly less than the mass of the magnet armature, it produces a lower impact noise. With that, the noise response of the valve, that is of importance in the case of comfort vehicles, is considerably improved in the direction of noise reduction. Because of the diaphragm spring, the effects, obtained in the known valves having a prestroke spring and armature free play, of boostering during the opening of the valve and the avoidance of the so-called bounce pulses during the closing of the valve are also achieved, and nevertheless, compared to these valves, components such as the additional armature stop on the valve needle and the prestroke spring used as helical compression spring, including mounting support, are saved.

Together with the diaphragm spring available in the trade, the costs of producing and assembling the valve may thereby be reduced. Using the diaphragm spring, a guidance of the magnet armature is realized at the same time, so that one may do without the additional guidance of the magnet armature in the valve housing or an upper guidance of the valve needle in the magnetic core of the electromagnet, including the tolerance specifications that would have to be adhered to in this context. In addition, the magnet armature may be configured in such a way that only the magnetically required mass has to be implemented, whereby the weight of the electromagnet is able to be reduced.

The measures specified in the further descriptions herein permit advantageous further developments and improvements of the valve disclosed herein.

According to one advantageous specific embodiment of the present invention, the support of the diaphragm on the valve housing is performed in such a way that when the valve is closed and no current is applied to the electromagnet, the diaphragm fastened to the magnet armature fixes the magnet armature in a neutral position, in which there is an axial distance defining a prestroke gap between the magnet armature and the driving flange. In response to an axial deflection from this neutral position of the magnet armature taking place in opposite directions, the diaphragm has different spring constants, the spring constant at the deflection directed away from the valve seat being small, and at a deflection directed towards the valve seat is very large, so that a swinging through of the magnet armature through the neutral position is prevented. Because of the low spring constant of the diaphragm in the pulling direction of the magnet armature when current is applied to the electromagnet, the electromagnet has to build up a relatively small magnetic force to attract the magnet armature when the valve is closed, before it hits the driving flange at the end of the armature path fixed by the prestroke gap. Because of the high spring constant of the diaphragm spring during the deflection from the neutral position in the opposite direction pointing towards the valve seat, the diaphragm spring offers a lower stop in the neutral position of the magnet armature, which prevents the swinging through of the armature in the direction of the closing of the valve. Because of that, the magnet armature is always in a specified position, which is of considerable importance, above all, for rapidly successive metering processes, as is the case for injecting fuel in fuel injection systems having multiple injection.

According to one advantageous specific embodiment of the present invention, the diaphragm spring has an outer and an inner spring washer and a plurality of spring crosspieces connecting the two spring washers to each other. The inner spring washer, which has a clearly smaller outer diameter than the outer diameter of the annular or hollow cylindrical magnet armature, is fastened to the lower side of the magnet armature facing the valve seat, and the outer spring washer, whose inside diameter is slightly smaller than the outer diameter of the magnet armature, is fastened to the valve housing. Because of this constructive embodiment, the different spring constants of the diaphragm spring during deflection in opposite directions are implemented in a simple manner. Upon a movement of the magnet armature away from the valve seat, because of the spring crosspieces in the diaphragm, a large free path is created using a small spring constant. When the magnet armature is moved in the direction of the valve seat, the magnet armature is set in an increasingly planar manner on the diaphragm, and the free path of the spring crosspieces is increasingly shortened, and in the neutral position of the magnet armature is limited only to the distance between the outer diameter of the magnet armature and the point of support on the valve housing, whereby the very high spring constant exists.

The present invention is explained in greater detail in the following description on the basis of an exemplary embodiment shown in the drawings.

DETAILED DESCRIPTION

Figure 1:
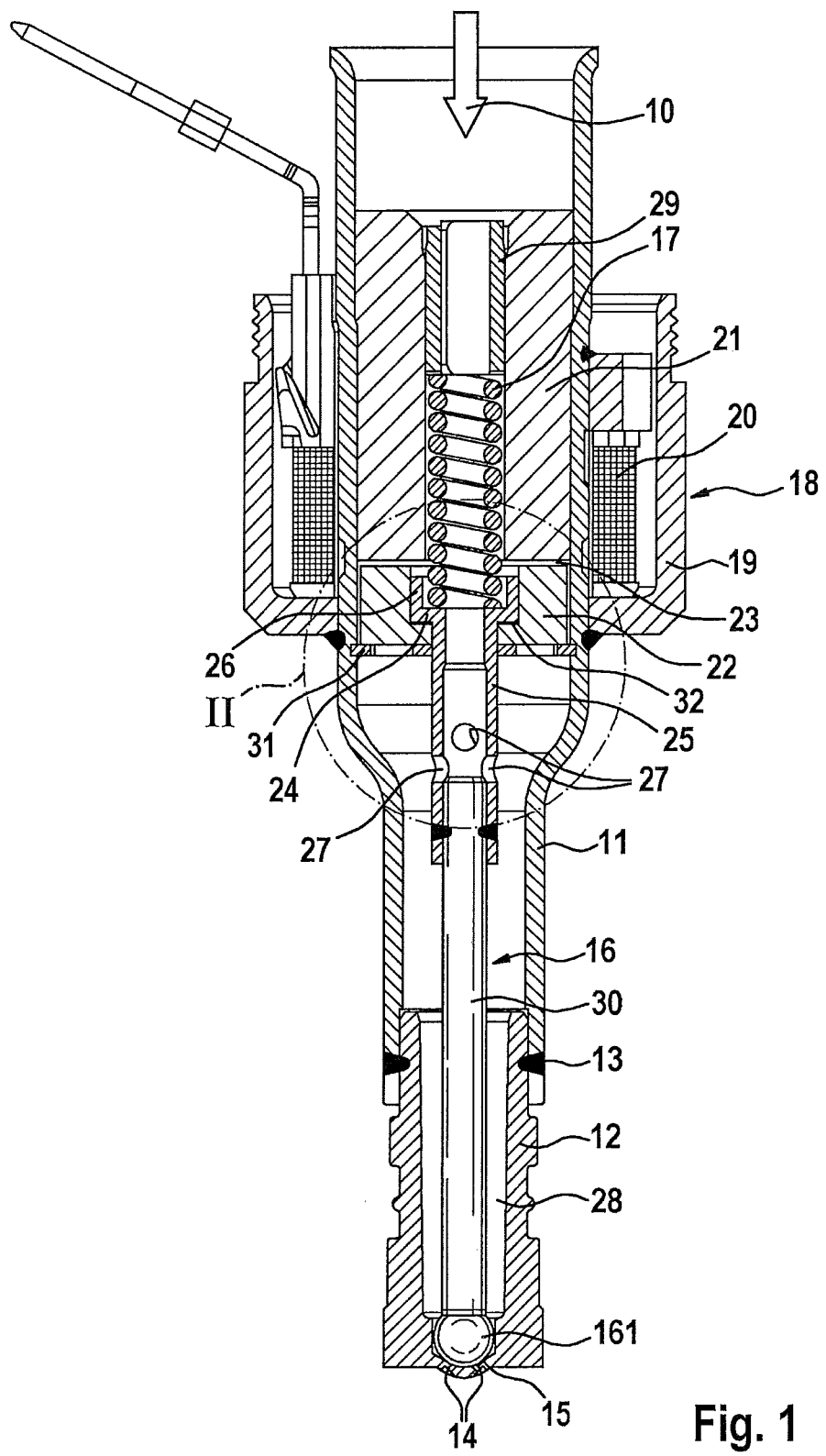
FIG. 1 shows a longitudinal section of a valve for metering fluid.

The valve for metering fluid, shown as longitudinal section in FIG. 1, is used, for example, as an injection valve for the injection of fuel in a fuel-injection system of internal combustion engines. The valve has a sleeve-shaped valve housing 11, in whose end, on the metering side, a valve body 12 is set in, and in whose end on the inflow side a connection piece (not shown here) for connecting a fluid line for an inflow of fluid, symbolized by arrow 10, is set in, in each case in a fluid-tight manner. Valve body 12 is connected to valve housing 11 in a continuous material manner, the continuous material being symbolized by welding seam 13. In valve body 12 there is configured a metering opening or valve opening 14, having two ejecting bores, that has a valve seat 15 surrounding the valve opening 14. A valve needle 16, that is axially displaceable in the valve housing 11, is provided with a closing member 161 that is able to be set onto valve seat 15 and lifted off from the valve seat 15, for the alternating closing and opening of the valve, that is, for closing and releasing valve opening 14. Valve needle 16 is guided in an axially displaceable manner in valve body 12 via its closing member 161, that is configured ball-shaped in this instance. In the exemplary embodiment, valve needle 16 is composed of a massive rod 30, which carries closing member 161 at its end, and a sleeve 25. Sleeve 25, that is set onto rod 30, at its end facing away from closing member 161, and welded to it has at least one bore 27, via which a fluid connection is produced from fluid inflow 10 to a valve chamber 28 that is arranged in front of valve seat 15, having valve opening 14. Alternatively, valve needle 16 may also be configured in one piece as a hollow cylinder and having the corresponding bores 27. To close the valve, valve needle 16 is acted upon by a resetting element 17, which has a pressure spring that is supported between valve needle 16 and a setting sleeve or adjusting sleeve 29, for example. The opening of the valve takes place using an electromagnet 18 acting on valve needle 16, which, in a known manner, has a magnetic pot 19, a magnetic coil 20, a magnetic core 21 and a magnet armature 22. Magnetic pot 19 is pushed onto valve housing 11 and welded at its pot bottom to valve housing 11, and accommodates magnetic coil 20 in an axially non-displaceable manner. Hollow cylindrical magnetic core 21 is set into valve housing 11 with form locking, and accommodates the pressure spring and adjusting sleeve 29 of resetting element 17 in the hollow core interior. Magnet armature 22 sits on valve needle 16, more accurately put, on sleeve 25, in an axially displaceable manner, and borders, together with magnetic core 21 that is situated coaxially with it, a working air gap 23 of electromagnet 18. On valve needle 16 there is situated a driving flange 24, via which magnet armature 22, driven to the lift stroke motion, takes along with it valve needle 16 when current is applied to electromagnet 18. In the exemplary embodiment, driving flange 24 is connected in an attached form to sleeve 25. At its end facing away from closing member 161, sleeve 25 has a guide collar 26, into which the end on the valve needle side of the pressure spring of resetting element 17 dips and supports itself on the bottom. In this alternative, one-piece hollow cylinder embodiment of valve needle 16, driving flange 24 and guide collar 26, that supports the pressure spring, are then connected in one piece in an attached form to valve needle 16.

Magnet armature 22, sitting on valve needle 16, more accurately put, on sleeve 25, is supported on valve housing 11 via a diaphragm spring 31. The support on valve housing 11 is done in such a way, in this instance, that when the valve is closed and no current is applied to electromagnet 18, diaphragm spring 31, that is fastened to magnet armature 22, fixes magnet armature 22 in a neutral position, in which, between magnet armature 22 and driving flange 24, an axial distance is present (FIG. 2) that defines a prestroke gap 32. In the case of axial deflections from the neutral position that take place in opposite directions, diaphragm spring 31 has different spring constants. In the case of a deflection from the neutral position directed away from valve seat 15, the spring constant is small. In the case of a deflection from the neutral position directed towards valve seat 15, the spring constant is so great that a swinging of magnet armature 22 through its neutral position is prevented when the valve is closing.

Figure 3:
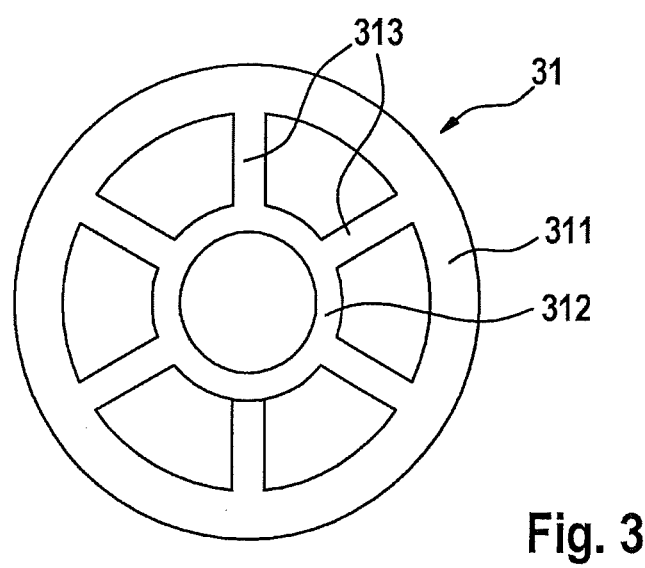
FIG. 3 shows a top view of a diaphragm spring in the valve according to FIGS. 1 and 2.

As may be seen in FIG. 3, diaphragm spring 31 has an outer spring washer 311 and an inner spring washer 312 and a plurality of spring crosspieces 313 connecting the two spring washers 311, 312 to each other. The outside diameter of inner spring washer 312 is clearly smaller than the outside diameter of annular or hollow cylindrical magnet armature 22, while the inner diameter of outer spring washer 311 is dimensioned somewhat smaller than the outside diameter of magnet armature 22. Inner spring washer 312 is fastened to the lower side of magnet armature 22 facing valve seat 15 and outer spring washer 311 is fastened to valve housing 11. If magnet armature 22 moves in the lift stroke direction, under the magnetic force created by the application of current to magnetic coil 20 of electromagnet 18, that is, away from valve seat 15, then, because of spring crosspieces 313, which increasingly lift off from the lower side of magnetic core 21, a large free path is created, and thereby a low spring constant of diaphragm spring 31 is achieved. In the opposite direction of motion of magnet armature 22, spring crosspieces 313 lie increasingly against the lower side of magnetic core 21, so that the free path of spring crosspieces 313 is increasingly shortened, and in the neutral position of magnet armature 22 is limited to the distance between the outer diameter of the magnet armature and the point of support on valve housing 11, whereby diaphragm spring 31 has the very high spring constant and prevents a swinging through of magnet armature 22 over the neutral position in the direction of valve seat 15.

Figure 2:
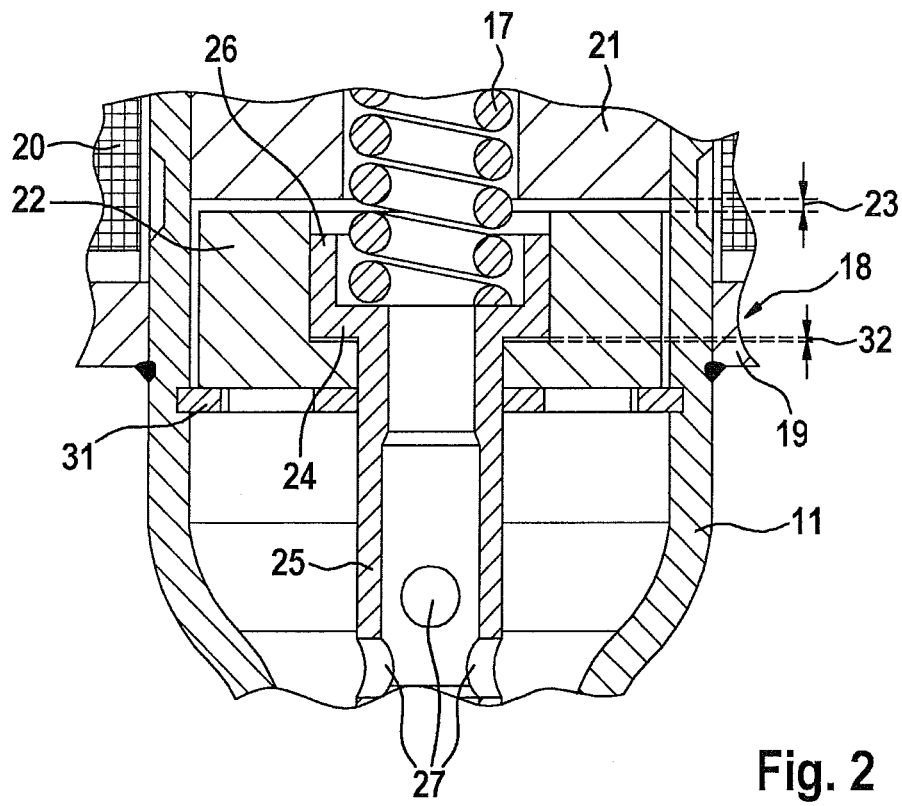
FIG. 2 shows an enlarged view of cutaway II in FIG. 1.

In the neutral position of magnet armature 22 shown in FIGS. 1 and 2, the valve is in an at-rest position, that is, closed when no current is supplied to electromagnet 18. The pressure spring of resetting element 17 presses closing member 161 onto valve seat 15, and diaphragm spring 31 holds magnet armature 22 in its neutral position. Working air gap 23, lying between magnet armature 22 and magnetic core 21 has its maximum gap height, and prestrike gap 32 that is present between magnet armature 22 and driving flange 24 also has a maximum gap width. When current is applied to electromagnet 18, magnet armature 22 moves upwards in the lift stroke direction, prestrike gap 32 being first closed, without closing member 161 of valve needle 16 lifting off from valve seat 15. Because of the low spring constant of diaphragm spring 31, in a manner similar to the mechanical bolstering, the magnetic force required for moving magnet armature 22 from its neutral position is relatively small, so that the magnetic power of electromagnet 18 may be kept small.

When electromagnet 18 is switched off, the pressure spring of resetting element 17 presses valve needle 16 with closing member 161 onto valve seat 15, whereby magnet armature 22 is carried along via driving flange 24 in the direction of valve seat 15 all the way to its neutral position fixed by diaphragm spring 31. Because of the very high spring constant of diaphragm spring 31 against deflection from the neutral position in the direction of valve seat 15, diaphragm spring 31 forms a flexible stop for magnet armature 22, so that it always takes on a specified position.

What is claimed is:

1. A valve for metering fluid, comprising:
    a valve housing, on which a valve opening, enclosed by a valve seat is configured;
    a valve needle, for alternating closing and opening of the valve, with a closing member that is settable upon the valve seat and lifted off from the valve seat;
    a resetting element configured to act upon the valve needle for closing the valve;
    an electromagnet to which current can be applied;
    an axially displaceable magnet armature, the valve needle passing through the magnet armature, the magnet armature being drivable in a lift stroke motion and being configured to carry the valve needle via a driving flange in the lift stroke direction to open the valve, the driving flange being situated on the valve needle; and
    a diaphragm spring supporting the magnet armature on the valve housing, the diaphragm spring having an outer spring washer and an inner spring washer, the outer spring washer and the inner spring washer being connected together via spring crosspieces, the outer spring washer being secured to the valve housing, and the inner spring washer supporting a lower side of the magnet armature, the valve needle passing through the outer spring washer and the inner spring washer;
    wherein, the inner spring washer is fastened to the lower side of the magnet armature.

2. The valve of claim 1, wherein an outer diameter of the inner spring washer is smaller than an outer diameter of the magnet armature and an inner diameter of the outer spring washer is smaller than the outer diameter of the magnet armature.

3. A valve for metering fluid, comprising:
    a valve housing, on which a valve opening, enclosed by a valve seat, is configured;
    a valve needle, for alternating closing and opening of the valve, with a closing member that is settable upon the valve seat and lifted off from the valve seat;
    a resetting element configured to act upon the valve needle for closing the valve;
    an electromagnet to which current can be applied;
    an axially displaceable magnet armature, the valve needle passing through the magnet armature, the magnet armature being drivable in a lift stroke motion and being configured to carry the valve needle via a driving flange in the lift stroke direction to open the valve, the driving flange being situated on the valve needle; and
    a diaphragm spring supporting the magnet armature on the valve housing, the diaphragm spring having an outer spring washer and an inner spring washer, the outer spring washer and the inner spring washer being connected together via spring crosspieces, the outer spring washer being secured to the valve housing, and the inner spring washer supporting a lower side of the magnet armature, the valve needle passing through the outer spring washer and the inner spring washer;
    wherein a support of the diaphragm spring on the valve housing is configured so that when the valve is closed and no current is applied to the electromagnet the diaphragm spring that supports the magnet armature fixes the magnet armature in a neutral position, such that an axial distance that defines a prestroke gap is present between the magnet armature and the driving flange;
    wherein the inner spring washer is fastened to the lower side of the magnet armature.

4. The valve of claim 3, wherein in response to an axial deflection from the neutral position taking place in opposite directions, the diaphragm spring has different spring constants so that a spring constant at the deflection directed away from the valve seat is small, and, at a deflection directed towards the valve seat, is so large that swinging of the magnet armature through the neutral position is prevented.

5. The valve of claim 3, wherein an outer diameter of the inner spring washer is smaller than an outer diameter of the magnet armature, and an inner diameter of the outer spring washer is smaller than the outer diameter of the magnet armature.

6. The valve of claim 3, wherein in response to an axial deflection from the neutral position taking place in opposite directions, the diaphragm spring has different spring constants so that a spring constant at the deflection directed away from the valve seat is small, and, at a deflection directed towards the valve seat, is so large that swinging of the magnet armature through the neutral position is prevented.

* * * * *